United States Patent
Schneider et al.

(10) Patent No.: US 10,942,838 B2
(45) Date of Patent: Mar. 9, 2021

(54) MICROCONTROLLER SYSTEM WITH IN-CIRCUIT DEBUGGER

(71) Applicant: INFINEON TECHNOLOGIES AUSTRIA AG, Villach (AT)

(72) Inventors: Matthias Schneider, Kirchheim (DE); Arndt Pauschardt, Sauerlach (DE); Yuanfen Zheng, Kirchheim bei München (DE)

(73) Assignee: Infineon Technologies Austria AG, Villach (AT)

( * ) Notice: Subject to any disclaimer, the term of this patent is extended or adjusted under 35 U.S.C. 154(b) by 134 days.

(21) Appl. No.: 16/242,919

(22) Filed: Jan. 8, 2019

(65) Prior Publication Data

US 2019/0220386 A1 Jul. 18, 2019

(30) Foreign Application Priority Data

Jan. 18, 2018 (DE) ..................... 10 2018 101 028.1

(51) Int. Cl.
| | |
|---|---|
| *G06F 11/36* | (2006.01) |
| *G06F 9/30* | (2018.01) |
| *G06F 1/3206* | (2019.01) |
| *G06F 1/32* | (2019.01) |

(52) U.S. Cl.
CPC ............ *G06F 11/3656* (2013.01); *G06F 1/32* (2013.01); *G06F 1/3206* (2013.01); *G06F 9/30134* (2013.01); *G06F 11/36* (2013.01)

(58) Field of Classification Search
CPC ......... G06F 11/36; G06F 11/3656; G06F 1/32
USPC .......................................................... 714/30
See application file for complete search history.

(56) References Cited

U.S. PATENT DOCUMENTS

| | | | | |
|---|---|---|---|---|
| 6,142,683 A | * | 11/2000 | Madduri | G06F 11/348 703/23 |
| 7,152,186 B2 | * | 12/2006 | Airaud | G06F 11/2242 714/30 |
| 7,216,276 B1 | * | 5/2007 | Azimi | G01R 31/31705 714/30 |
| 7,418,629 B2 | * | 8/2008 | Al-Omari | G06F 11/348 714/30 |
| 7,577,874 B2 | * | 8/2009 | Jones | G06F 11/362 714/31 |
| 7,802,140 B2 | * | 9/2010 | Iwamoto | G01R 31/31901 714/27 |
| 7,913,123 B2 | * | 3/2011 | Al-Omari | G06F 11/348 714/45 |
| 7,992,051 B2 | * | 8/2011 | Al-Omari | G06F 11/2268 714/45 |

(Continued)

OTHER PUBLICATIONS

Office Action, Application No. 10 2018 101 028.1, dated Oct. 8, 2018, pp. 5.

*Primary Examiner* — Kamini B Patel
(74) *Attorney, Agent, or Firm* — Armis IP Law, LLC

(57) ABSTRACT

An electronic device is described herein. In accordance with one embodiment, the electronic device includes an embedded controller having a debug logic, an interface circuit coupled to the debug logic, and a memory coupled to the interface circuit. The interface circuit is operative to read debug information stored in the debug logic and to transmit the read debug information to the memory. The interface circuit is further operative to receive debug information stored in the memory and write the received debug information into the debug logic.

28 Claims, 5 Drawing Sheets

(56) References Cited

U.S. PATENT DOCUMENTS

| | | | |
|---|---|---|---|
| 8,799,713 B2* | 8/2014 | Gangasani | G06F 11/27 |
| | | | 714/30 |
| 9,632,137 B2 | 4/2017 | Ramsay et al. | |
| 2004/0008713 A1* | 1/2004 | Knight | G06F 13/28 |
| | | | 370/428 |
| 2006/0259831 A1* | 11/2006 | Sohm | G06F 9/30145 |
| | | | 714/45 |
| 2010/0095154 A1* | 4/2010 | Shih | G06F 11/3648 |
| | | | 714/30 |
| 2016/0313396 A1* | 10/2016 | Ramsay | G01R 31/31705 |
| 2017/0082688 A1* | 3/2017 | Hsu | G06F 11/3652 |
| 2017/0371577 A1* | 12/2017 | Liu | G06F 3/0619 |

* cited by examiner

MICROCONTROLLER SYSTEM WITH IN-CIRCUIT DEBUGGER

RELATED APPLICATION

This application is related to and claims priority to earlier filed German patent application serial number 102018101028.1 entitled "MICROCONTROLLER SYSTEM WITH IN-CIRCUIT DEBUGGER,", filed on Jan. 18, 2018, the entire teachings of which are incorporated herein by this reference.

BACKGROUND

Microcontrollers are used in a large variety of applications and are particularly employed for the control of electrical, mechanical or electromechanical systems. One example of such an electrical system is a switched-mode power supply (SMPS); an SMPS may include a microcontroller which performs all the core functions needed to control the system in order to obtain a desired system behavior.

Dependent on the application, a microcontroller is often embedded in an Application Specific Integrated Circuit (ASIC) together with other circuits such as interface circuits needed to connect with sensor circuits, driver circuits, communication interfaces, etc. In many applications power consumption is an issue and, therefore, many microcontrollers include (or are coupled with) a so-called Power Management Unit (PMU), which is operative to put the microcontroller (and other circuity) in a low power consumption mode (also referred to as power-down mode or sleep mode) in the event that the system's state meets one or more pre-defined conditions. The PMU is also operative to "wake up" the microcontroller from the low power consumption mode in the event that one or more function(s) implemented by the microcontroller is (are) again needed to control the system.

As is commonly known, the function(s) provided by a microcontroller are basically determined by software (sometimes referred to as firmware in case of embedded systems). Dependent on the application, software may be comparably complex and prone to error; therefore the software development process usually includes an activity commonly referred to as debugging, which is done, for example, for the purpose of analyzing software to find errors and to verify the software-implemented functions.

To allow debugging under "realistic" conditions, modern microcontrollers usually include hardware support for debugging, thus enabling in-system programming, support for hardware breakpoints, etc. For debugging, the debug target (i.e. the microcontroller) may be connected with a debug host (e.g. a personal computer executing a software application referred to as debug frontend) via a debug adapter. The adapter basically forms an interface/converter between a standard personal computer interface such as USB (Universal Serial Bus) and a standardized JTAG (Joint Test Action Group) connector on the circuit board carrying the debug target. The information used in the debug target during debugging is usually referred to as debug context and can be downloaded from the debug host to the debug target via the mentioned adapter.

Systems which may repeatedly enter low power consumption mode and wake up again during operation present challenges with regard to debugging as the debug context is usually lost when the microcontroller enters low power consumption mode.

SUMMARY

An electronic device is described herein. In accordance with one embodiment the electronic device includes an embedded controller having a debug logic (such as hardware and/or software), an interface circuit coupled to the debug logic, and a memory coupled to the interface circuit. The interface circuit is operative to read debug information stored in the debug logic and to transmit the read debug information to the memory. The interface circuit is further operative to receive debug information stored in the memory (such as hardware storage) and write the received debug information into the debug logic.

Furthermore, a method is described herein that, in accordance with one embodiment, includes—during a changeover into a low power consumption mode of an electronic device with an embedded controller—reading, by an interface circuit, debug information from a debug logic of the embedded controller, and transmitting the read debug information to a memory. Furthermore, the method includes—when leaving the low power consumption mode—receiving, by the interface circuit, debug information from the memory, and restoring the received debug information in the debug logic.

Moreover, a switched mode power supply (SMPS) is described herein. In accordance with one embodiment the SMPS includes a switching converter and an integrated control circuit coupled to the switching converter and operative to control the switching operation of the switching converter. The integrated control circuit includes an embedded controller with a debug logic, an interface circuit coupled to the debug logic, and a memory coupled to the interface circuit. The interface circuit is operative to read debug information stored in the debug logic and transmit the read debug information to the memory, and the interface circuit is further operative to receive debug information stored in the memory and to write the received debug information into the debug logic.

BRIEF DESCRIPTION OF THE DRAWINGS

The invention can be better understood with reference to the following drawings and descriptions. The components in the figures are not necessarily to scale; in-stead emphasis is placed upon illustrating the principles of the invention. More-over, in the figures, like reference numerals designate corresponding parts. In the drawings.

DETAILED DESCRIPTION

Figure 1:
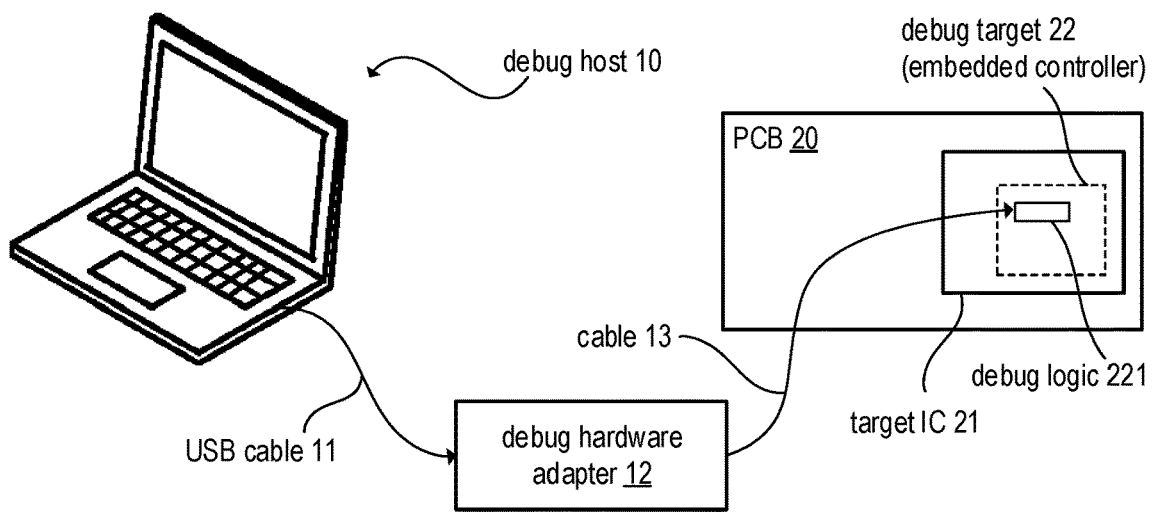
FIG. 1 illustrates one exemplary set-up which may be used to debug a microcontroller employed, for example, in an embedded system.

FIG. 1 illustrates one exemplary set-up which may be used to debug a microcontroller employed, for example, in an embedded system. Generally microcontrollers include a microprocessor (processing hardware with one or more processor cores) and at least some circuitry that provides some basic peripheral functions such as input/output interfaces (e.g. serial communication interfaces), memory, etc. Although the process of debugging mainly relates to the microprocessor, the term microcontroller is used throughout the description.

According to the example of FIG. 1 a printed circuit board 20 (PCB, also referred to as target board) carries, among other electronic components, a target IC 21 (electronic device) which includes an embedded microcontroller 22, also referred to as debug target in the examples described herein. The embedded microcontroller includes a logic circuit 221 (hardware), which is also referred to as debug logic and which provides the basic functions needed for hardware debugging such as hardware breakpoints, etc. The debug logic 221 is coupled with (to) a debug hardware adapter 12, e.g. via cable 13 (wired or wireless communication link). In the depicted example, the debug hardware adapter 12 is a separate device. However, the electronic circuits forming the debug hardware adapter 12 may also be arranged on the PCB 20.

In one embodiment, the debug hardware adapter 12 includes a communication interface such as a Universal Serial Bus (USB) interface. The USB interface allows to connect the debug hardware adapter 12 to a personal computer (PC, referred to as debug host 10), e.g. via USB cable 11 (such as a wired or wireless communication link), thus enabling communication with the PC which executes a software application that implements the debugger front and may include a graphical user interface.

As mentioned above, a problem arises when the embedded microcontroller 22 enters a low power consumption mode, as information stored in the debug logic and used during debugging may be lost. This information is referred to as debug context information or, in short, debug context and includes information concerning hardware breakpoints or the like. Once a wake-up of the microcontroller 22 is triggered, it may take a few microseconds until the operation of the microcontroller 22 reaches a steady state. In contrast, it would take several milliseconds for the debug host to download the debug context and start the debugging context. As a consequence, without further measures a debugging of the microcontroller is not possible during the start-up phase following a wake-up signal, because the debug logic is still in an idle state after microcontroller wake-up. Nevertheless, at least for some applications such as SMPS, debugging capability during the mentioned start-up phase would be desirable or may even be required in some situations. The system behavior for applications like SMPS (and generally for applications operating under hard real-time requirements) following wake-up events has stringent behavioral requirements, thus needs to be observable and consequently debuggable.

Figure 2:
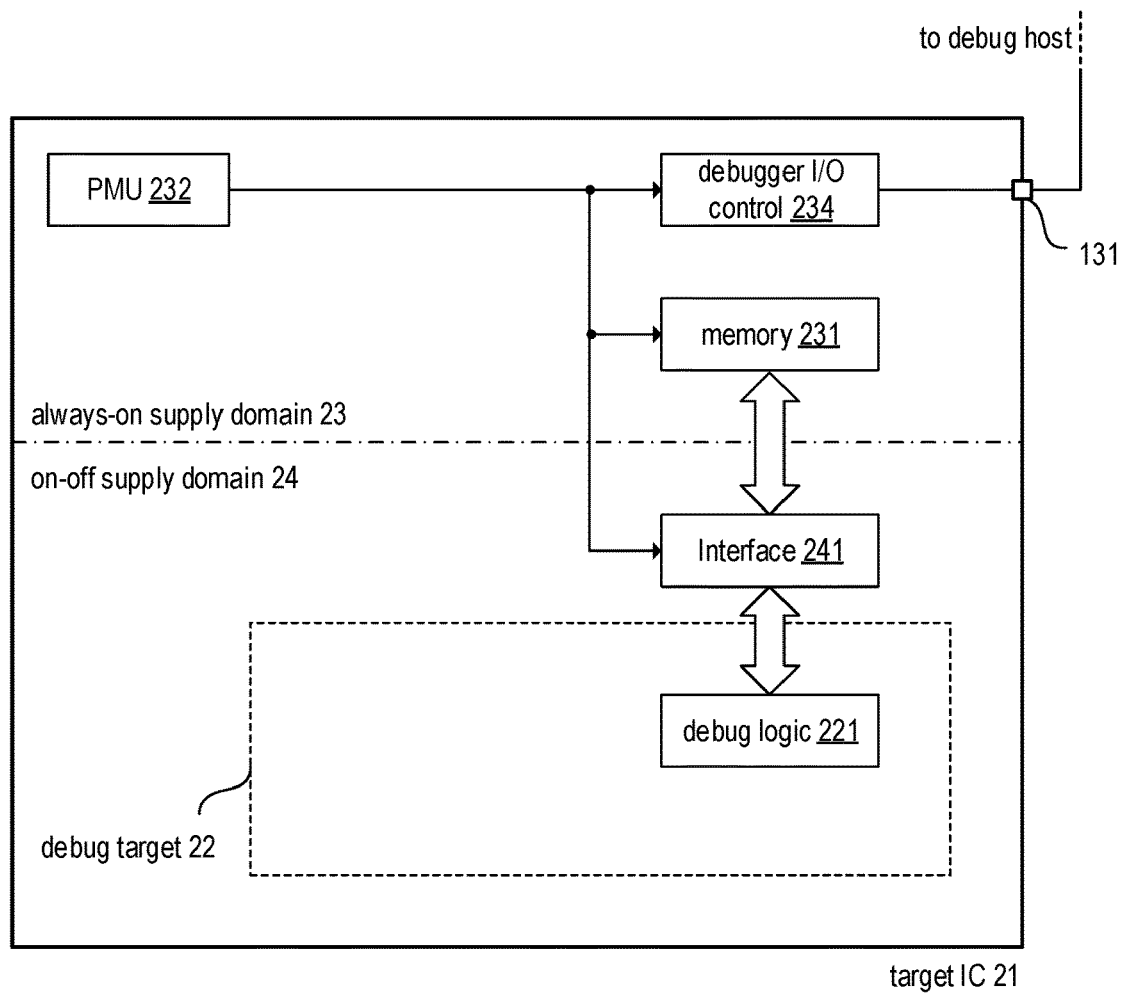
FIG. 2 is a block diagram illustrating a target IC (e.g. an ASIC) including an embedded microcontroller, a PMU and debugger hardware in accordance with a first embodiment.

FIG. 2 illustrates in a block diagram one example of an integrated circuit (target IC 21), e.g. an ASIC, which includes two or more portions referred to as supply domains (or power domains). Each supply domain (different circuit portion) includes at least one voltage supply (power supply) for supplying the electronic components and circuits included in the respective supply domain. The voltage supply of one supply domain operates independently from the voltage supply of another supply domain. The different voltage supplies may be implemented by separate supply circuits (including voltage regulators, etc.) which receive the same supply voltage via an external pin of the IC or different supply voltages via different external pins of the IC.

In the example shown in FIG. 2, the target IC 21 includes a first supply domain 23 and a second supply domain 24; the first supply domain 23 is referred to as "always-on" supply domain, whereas the second supply domain 24 is referred to as "on-off" supply domain. That is, the voltage supply of the second supply domain 24 can be switched off during low power consumption mode, whereas the voltage supply of the first supply domain 23 is always active (on) during normal operation (such as a non-low power consumption mode or a standard power consumption mode) as well as during low power consumption mode. Dependent on the actual implementation, further supply domains (on-off supply domains as well as always-on supply domains) may be provided in the target IC. It is noted that signaling between two different supply domains usually requires a kind of interface circuit, such as level-shifter or the like.

In many applications it is desirable to switch the embedded microcontroller (debug target 22) off during low power consumption mode, as the microcontroller is an electric load, which significantly contributes to the total power consumption of the target IC 21. Thus, the debug target 22, which includes the debug logic 221, resides in the on-off supply domain 24, whose voltage supply is deactivated when entering low power consumption mode. As a consequence, the debug context stored in the debug logic 221 is lost when the debug target is powered down.

The second supply domain 24 (always-on supply domain) includes circuitry which needs to remain active during low power consumption mode. In the present example, the PMU 232 is included in the always-on supply domain, as one task of the PMU 232 is to trigger a wake-up (i.e. to leave the low power consumption mode) which includes re-activating the voltage supply of the on-off supply domain. Generally, the PMU 232 is operative to monitor the operation of the target IC 21 and other circuitry coupled thereto and to trigger a transition into low power consumption mode as well a wake-up in response to the detection of specific events. The events, which cause transition into low power consumption mode (power down event) and wake-up (wake-up event) may be different for different applications. In a SMPS a wake-up may be triggered, e.g., when the output current exceeds a specific wake-up threshold value, and a transition into low power consumption mode may be triggered when the output current drops below the specific power-down threshold value.

In accordance with the examples described herein, the debug context information stored in the debug logic 221 (hardware and/or software) is backed up (e.g. stored in) a memory 231 (hardware storage) that resides in the first supply domain 23 (always-on supply domain). Accordingly, the debug context information is kept in the memory 231 while the debug target 22 is in low power consumption mode. A backup of the debug context information may be triggered by the PMU 232 directly before the voltage supply of the second supply domain is powered down when entering the low power consumption mode. When the PMU 232 triggers a wake-up from the low power consumption mode, the debug context information is restored form the memory 231 and copied (or moved) back to the debug logic 221. These backup and restore processes may be accomplished within a few microseconds and debugging functions become available (and thus usable) during the start-up phase of the debug target after a wake-up signal without a debug adapter or debug host being communicating with the debug target at this time.

As shown in the example of FIG. 2, an interface circuit 241 is provided in the second supply domain 24 (on-off supply domain) that is coupled to the debug logic 221 and operative to transfer the debug context information included in the debug logic 221 to the memory 231. One may think of debug context information as a sequence of bits (e.g. a 62 bit word) stored in a register (debug context register) included in the debug logic 221. When the PMU 232 signals a request to back up the debug context, the interface circuit 241 reads the debug context information from the debug logic 221 and transfers the information to memory 231 across the supply domain border. Similarly, when the PMU 232 signals a request to restore the debug context, the interface circuit 241 receives the debug context information from the memory 231 across the supply domain border and writes the received information to the debug context register in the debug logic 221.

In the present example, the first supply domain 23 (always-on supply domain) further includes a debugger input/output (I/O) control circuit 234, which may be regarded as an interface circuit between the target IC 21 and the debug hardware adapter 12 (see also FIG. 1), which is connected via I/O pins or connectors 131. During low power consumption mode the PMU 232 causes the debugger I/O control circuit 234 to signal the low power consumption mode to the debug host 10 via the debug hardware adapter 12. This signaling may be accomplished by actively pulling the voltage of the data link (included in cable 13, see FIG. 1) to a low voltage level, which may be detected by the debug hardware adapter 12 and communicated further to the debug host 10. The software application executed by the debug host is, in this way, informed of the low power consumption mode of the target IC 21, and will not try to reconnect or otherwise communicate with the debug target 21 as long as the voltage level of the data link indicates a low power consumption mode. Of course, any other link may be used to signal a low power consumption mode instead of the data link. High/Low voltage levels may be inverted in different applications.

Figure 3:
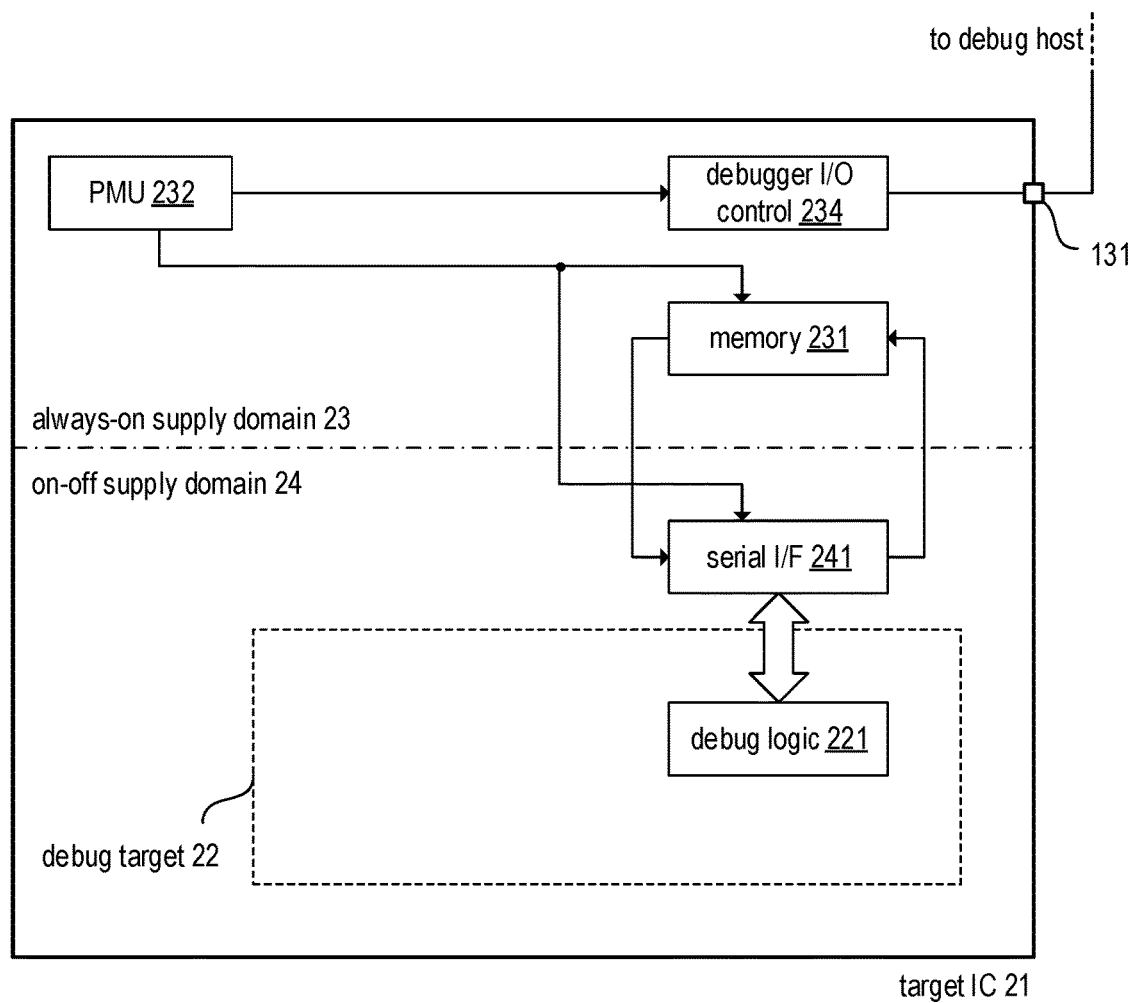
FIG. 3 is a block diagram illustrating one exemplary implementation of the embodiment of FIG. 2 in more detail.

FIG. 3 is a block diagram illustrating one exemplary implementation of the embodiment of FIG. 2 in more detail. According to FIG. 3, the interface circuit 241 includes a serial interface which is operative to read the debug context information (e.g. the mentioned 62-bit word) from the debug logic 221 and transfer this information to the memory 231 in the form of a serial data stream in order to back up the debug context information (backup when entering low power consumption mode). The interface circuit 241 is further operative to receive the debug context information from the memory 231 as serial data stream and to restore the debug context in the debug logic 221 (restore when leaving low power consumption mode and resuming normal operation). In this example, the memory 231 may be, for example, a serial in/serial out shift register.

The interface circuit 241 may also include one or more shift registers forming, for example, a kind of SerDes (Serializer/Deserializer). In this case one shift register of the SerDes forms a PISO (parallel in/serial out) block operative to read the debug context information from the debug logic 221 (e.g. the mentioned 62-bit word) and to serialize the debug context information thus generating the mentioned serial data stream transferred to the memory 231. Similarly, another shift register of the SerDes forms a SIPO (serial in/parallel out) block operative to receive the serial data stream from the memory 231 (including the backed up debug context) and to restore the received debug context information in the debug logic 221 e.g. by writing the received 62-bit word to the debug context register of the debug logic 221.

Figure 4:
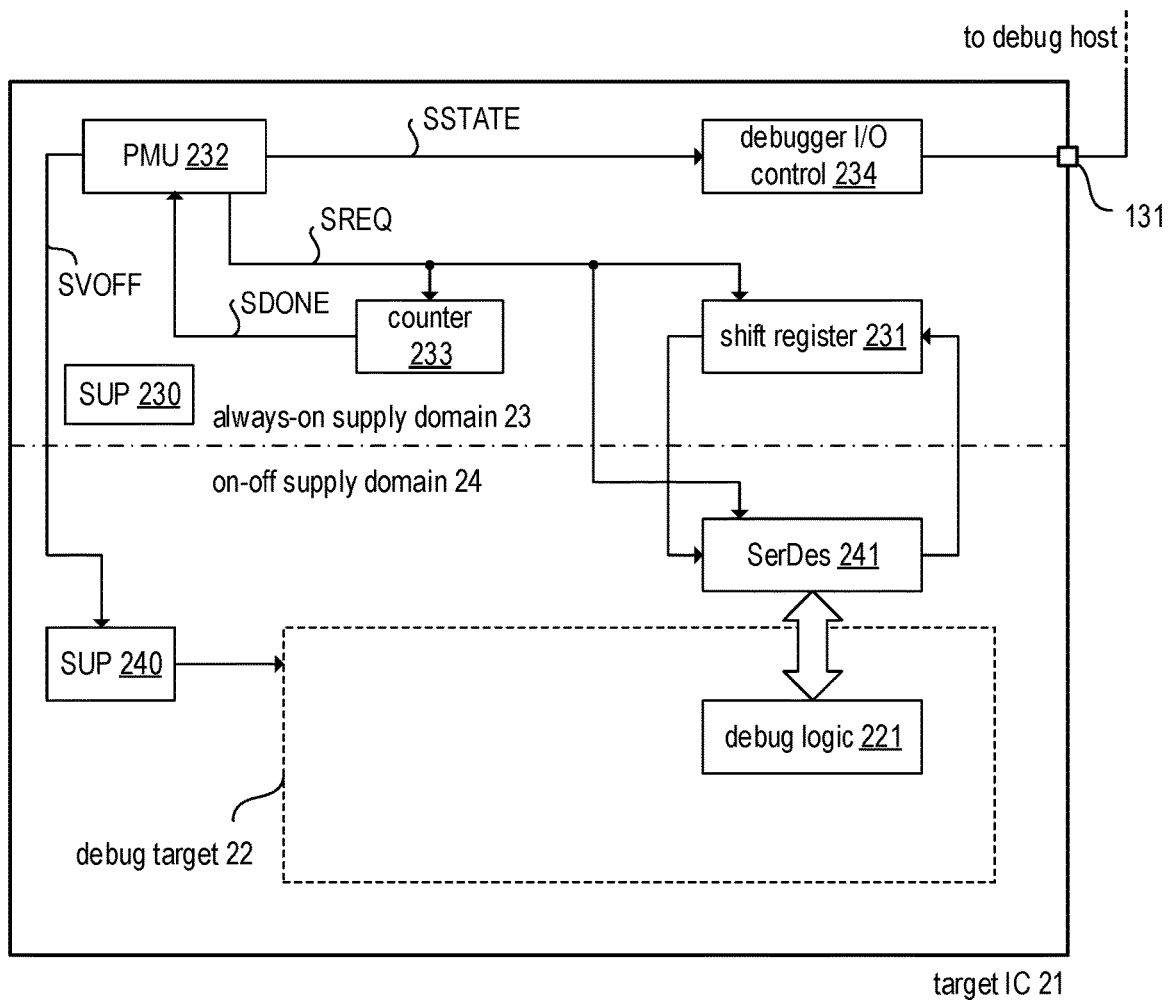
FIG. 4 is a block diagram illustrating another exemplary implementation of the embodiment of FIG. 2 in more detail.

Apart from the interface circuit 241 and the memory 231, the example of FIG. 3 is the same as the previous example of FIG. 2 and reference is made to the respective explanations above. FIG. 4 is a block diagram illustrating another exemplary implementation of the example of FIG. 2. According to FIG. 4, the memory 231 is implemented as a shift register and the interface circuit 241 as SerDes, which has already been discussed above. In the present example, a counter 233 is included in the first supply domain 23 and operative to count the bits transferred from the memory 231 (shift register) to the interface circuit 241 (SerDes) or vice versa. As soon as a data transfer is completed (e.g. once all 62 bits of the debug context have been backed up or restored), the counter may signal completion of the data transfer to the PMU 232 (see FIG. 4, logic signal SDONE).

A data transfer from or to the memory 231 (shift register) may be triggered by the PMU 232 by signaling a request to the memory 231 and the interface circuit 241 (SerDes). For this purpose the PMU 232 may generate a logic signal SREQ (request signal) with a defined logic level (e.g. a high level) which is supplied to the memory 231 and the interface circuit 241. The request signal SREQ may reset the counter 233 and trigger a data transfer from the memory 231 to the interface circuit 241 or vice versa dependent on whether the target IC is about to enter low power consumption mode or wakes up therefrom. The PMU 232 also signals the low power consumption mode to the debugger I/O control circuit 234, e.g. by logic signal SSTATE. As explained above, the debugger I/O control circuit 234 may further signal the state of the target IC 21 (low power consumption mode active or inactive) to the debug host 10. Also shown in FIG. 4 are the voltage supply circuits 230 and 240 of the first supply domain 23 and the second supply domain 24, respectively. The PMU 232 may power down the voltage supply 24 of the second supply domain (on-off supply domain) by generating a respective logic signal SVOFF. In contrast thereto, the voltage supply circuit 230 remains active even during the low power consumption mode.

Figure 5:
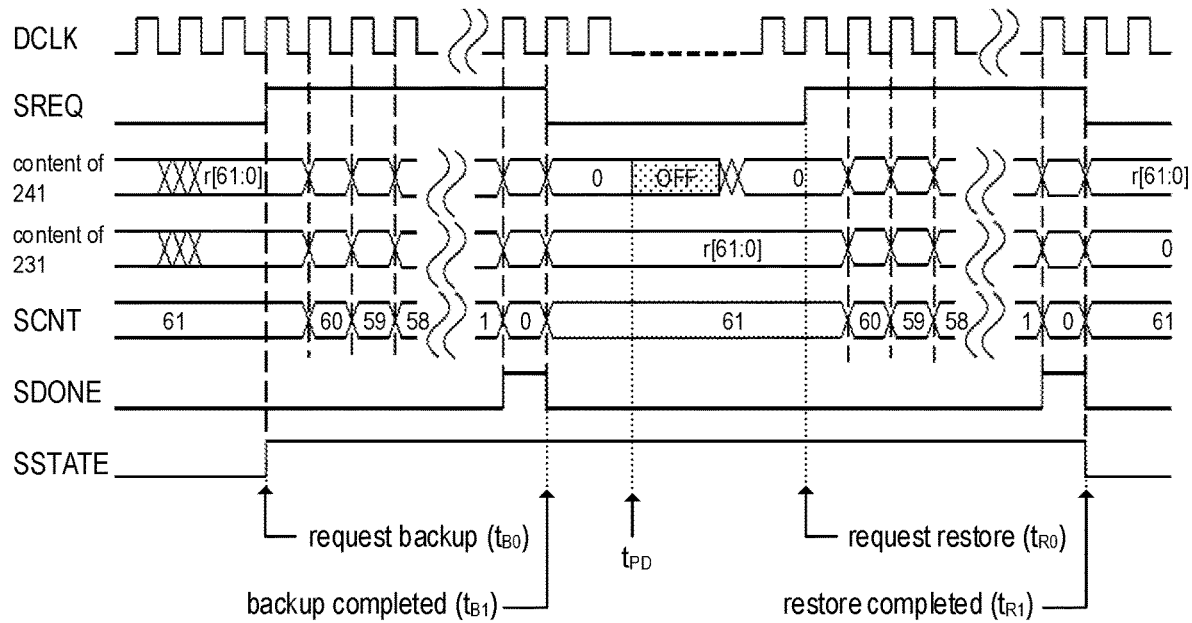
FIG. 5 includes timing diagrams illustrating the function of the example of FIG. 4.

The function of the embodiment shown in FIG. 4 is further explained with reference to the timing diagrams of FIG. 5. The first (top) timing diagram of FIG. 5 illustrates a clock signal DCLK which may be generated, for example, by a clock generator residing in the second supply domain 24 (on-off supply domain). The clock may, for example, be generated by the embedded controller 22 (debug target) in case the clock generator is part of the debug target. However, separate clock generators may be used dependent on the actual implementation. In the present example, the PMU 232 detects an event which indicates to power down the second voltage domain. However, before actually powering down the voltage supply 240, the PMU 232 sets the request signal SREQ to a high level at time $t_{B0}$ thus triggering the backup of the debug context (see second timing diagram of FIG. 5). At time instant $t_{B0}$ the debug context represented by the 62-bit data word r[61:0] is read in by the interface circuit 241, e.g. loaded into a shift register in the PISO block of the SerDes. Subsequently, a serial data stream is generated by shifting the data word from the SerDes (interface circuit 241) to the backup memory 231 (shift register) cross the supply domain border (see third and fourth timing diagram of FIG. 5). After 62 clock cycles, at time $t_{B1}$, the data word r[61:0] has been fully shifted to the backup memory 231, while the shift register in PISO block of the SerDes has been filled with zeros (or any other data). The clock cycles are counted by counter 233 (see fifth timing diagram of FIG. 5), and the completion of the backup is indicated by signal SDONE (see sixth timing diagram of FIG. 5).

The backup process, i.e. the data transfer from the SerDes to the memory 231 takes only a few microseconds. In the depicted example, the voltage supply 240 of the second supply domain 24 is powered down at time $t_{PD}$ and the data stored in the debug logic 221 as well as the content of the shift registers in the interface circuit 241, are lost. During low power consumption mode the PMU 232 continues to monitor the system and triggers a wake-up as soon as a wake-up event is detected. In the present example, the signal SREQ indicates (see second timing diagram of FIG. 5) a restoration of the debug context at time $t_{R0}$, and the data is shifted back across the supply domain border from the memory 231 to the shift register in the SIPO block of the SerDes (interface circuit 241). After 62 clock cycles, at time $t_{R1}$, the data word r[61:0] has been fully shifted to the shift register in the interface circuit 241 and is written to the debug logic 221. The completion of the restoration is indicated by signal SDONE (see sixth timing diagram of FIG. 5). The restoration process, i.e. the data transfer from the memory 231 to the SerDes takes only a few microseconds and debugging functions are available practically immediately after wake-up of the embedded controller. Between time $t_{B0}$, at which backup of the debug context is initiated, and time $t_{R1}$, at which restoration of the debug context is completed, the signal SSTATE indicates the low power consumption mode to the debug host as mentioned above (see seventh timing diagram of FIG. 5).

Figure 6:
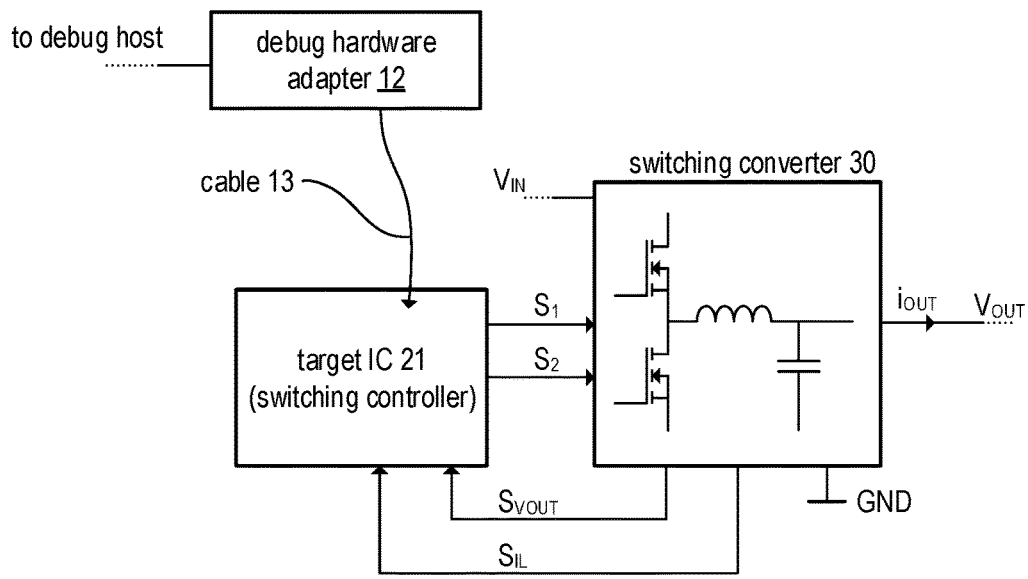
FIG. 6 is a block diagram illustrating an SMPS including a switching converter and a switching converter that includes an embedded microcontroller.

FIG. 6 illustrates one exemplary application of an integrated control circuit (control IC) with an embedded controller providing hardware debugging functions. In the depicted example, a control IC 21 is employed to control the operation of a switched mode power supply (SMPS). For power conversion, the SMPS may include a switching converter 30, which may be a DC/DC converter (e.g. buck converter, a buck-boost converter, etc.), an AC/DC converter, a power factor controller or the like. Various switching converter topologies are as such known and thus not further discussed herein. Basically, the control IC 21 is operative to receive one or more feedback signals from the switching converter; the feedback signals may carry information concerning the current state of the switching converter, which may be represented, inter alia, by output current, output voltage, input voltage etc. Accordingly, the feedback signals may comprise a current sense signal $S_{IL}$ and a voltage sense signal $S_{VOUT}$ representing the output current and the output voltage, respectively. Based on the feedback signals and further information (e.g. a voltage set-point for the output voltage), the control IC 21 generates driver signals $S_1$ and $S_2$ that control the switching operation of the switching converter 30, e.g. the switch-on and switch-off of the electronic switch(es) included in the switching converter 30.

Switching converters may be operated in various modes such as, for example, continuous conduction mode (CCM) with pulse-width modulation (PWM), discontinuous conduction mode (DCM) with PWM, DCM with pulse frequency modulation (PFM), etc. Control structures and algorithms for controlling a switching converter in a particular mode as well as during a mode switch are also known and not further explained herein in more detail. Particularly when the electric load connected to a SMPS is low (or even zero) the power consumption of the switching converter should also be low. Therefore, the SMPS may be operated in a low power consumption mode when the output current consumed by a load is below a predetermined threshold value. As mentioned above, low power consumption mode entails powering down the embedded controller included in the control IC 21 (see, e.g., FIG. 2-4, embedded controller 22). In order to enable hardware debugging of the embedded controller, a backup/restore mechanism for the debug information may be provided as explained in detail with reference to FIGS. 2-5.

System debugging (e.g. software and firmware debugging) is particularly interesting during mode switches such as in in the start-up phase of the embedded controller when the low power consumption mode is left. In a typical implementation, the start-up phase may last for approximately 50 to 500 microseconds. Restoring the debug information from the backup memory to the debug logic may be accomplished within a few hundred nanoseconds and hardware debugging is available from the beginning of the start-up phase of the microcontroller.

Figure 7:
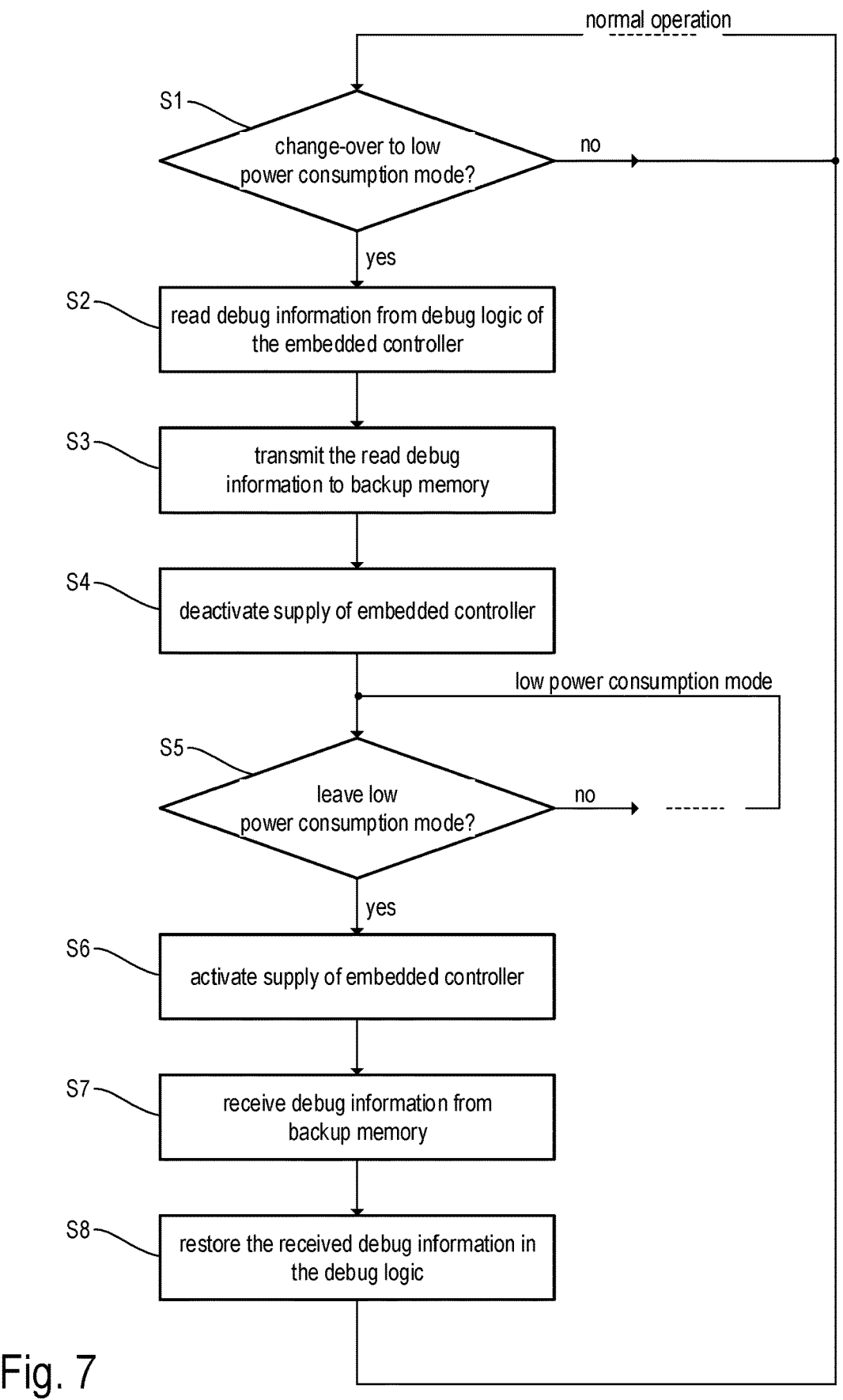
FIG. 7 is a flow chart illustrating on example of a method for handling a mode switch between normal operation and low power consumption mode of a microcontroller in accordance with one embodiment.

FIG. 7 is a flow chart illustrating one example of a method for handling a mode switch between normal operation and low power consumption mode of a microcontroller in accordance with one embodiment. The method may be implemented in a target IC (e.g. a control IC of a SMPS) as discussed above with reference to FIGS. 2-4. As mentioned above, the PMU 232 (see FIG. 2-4) may detect events which indicate mode switch conditions. Such an event may be, for example, the output current of an SMPS falling below a predetermined threshold or exceeding another predetermined threshold.

Normal operation is maintained (see FIG. 7, step S1, "no" branch) until an event is detected that indicates a mode switch condition for a change-over into low power consumption mode (see FIG. 7, step S1, "yes" branch). Upon detection of such an event, the PMU 232 initiates a change-over to low power consumption mode, which entails reading the debug information from the debug logic (221) of the embedded controller (22) included in the target IC 21, e.g., by the interface circuit 241 (see FIG. 7, step S2) and transmitting the read debug information to the (backup) memory 231 (see FIG. 7, step S3). Finally, the supply of the embedded controller is deactivated, e.g. switched off or disconnected (see FIG. 7, step S4). It is understood that the PMU as well as the backup memory reside in a supply domain which is always on, whereas the embedded controller resides in a different supply domain which is inactive during low power consumption mode.

Low power consumption mode is maintained (see FIG. 7, step S5, "no" branch) until an event is detected that indicates a mode switch condition for returning to normal operation (see FIG. 7, step S5, "yes" branch). Upon detection of such an event, the PMU 232 initiates a change-over to normal operation. To leave the low power consumption mode, the supply of embedded controller (see FIG. 7, step S6) is reactivated, the interface circuit receives the debug information from the backup memory 231 (see FIG. 7, step S7) and restores the received information in the debug logic (see FIG. 7, step S8).

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

We claim:

1. An electronic device comprising:
an embedded controller including debug logic;
an interface circuit coupled to the debug logic;
memory coupled to the interface circuit;
a power management unit;
wherein the interface circuit is operative to, in a first debugger data management mode, retrieve debug information stored in the debug logic and transmit the read-debug information to the memory;
wherein the interface circuit is further operative to, in a second debugger data management mode, retrieve the debug information stored in the memory and write the retrieved debug information into the debug logic;
wherein the power management unit is operative to trigger the interface circuit to operate in the first debugger data management mode in response to switchover of the electronic device from a normal power consumption mode to a low power consumption mode; and
wherein the power management unit is further operative to trigger the interface circuit to operate in the second debugger data management mode in response to switchover of the electronic device from the low power consumption mode to the normal power consumption mode.

2. The electronic device of claim 1,
wherein the interface circuit and the memory are connected via at least one serial data link; and
wherein the interface circuit is operative to receive and transmit debug information as a serial data stream across the at least one serial data link.

3. The electronic device of claim 1,
wherein the interface circuit includes a Serializer/Deserializer operative to read and write the debug information from and, respectively, to the debug logic as binary data words and is further operative to transmit and receive the debug information to and, respectively, from a shift register included in the memory as serial data.

4. The electronic device of claim 1, wherein the power management unit is further operative to power down the embedded controller in response to a condition of switching over the electronic device from normal power consumption mode to the low power consumption mode.

5. The electronic device of claim 4 further comprising:
a semiconductor chip including the embedded controller, the interface circuit, and the memory.

6. The electronic device of claim 1 further comprising:
at least one external contact;
an input/output (I/O) control circuit operative to establish a connection with an external host computer via the at least one external contact, the connection operative to convey communications between the external host computer and the debug logic; and
wherein the I/O control circuit is operative to signal the low power consumption mode to the external host computer.

7. The electronic device of claim 1 further comprising:
a semiconductor chip including the embedded controller, the interface circuit, and the memory.

8. The electronic device of claim 7,
wherein the semiconductor chip includes multiple supply domains, each supply domain having a voltage supply for supplying power to circuitry residing within the respective supply domain; and
wherein the voltage supply is active during the normal power consumption mode and the low power consumption mode in a first supply domain of the multiple supply domains; and
wherein the voltage supply is inactive in the low power consumption mode in a second supply domain of the multiple supply domains.

9. The electronic device of claim 7,
wherein the embedded controller resides in the second supply domain and the memory resides in the first supply domain.

10. The electronic device of claim 1,
wherein the memory and the interface circuit include a shift register.

11. The electronic device of claim 1, wherein the power management unit is operative to: i) supply power to the embedded controller during the normal power consumption mode, and ii) discontinue supply of power to the embedded controller during the low power consumption mode.

12. The electronic device of claim 1, wherein the low power consumption mode is a power savings mode with respect to the normal power consumption mode.

13. The electronic device of claim 1, wherein the power management unit is operative to generate a first control signal and a second control signal to the interface circuit, the first control signal operative to trigger operation of the interface circuit in the first data debugger management mode, the second control signal operative to trigger operation of the interface circuit in the second data debugger management mode.

14. The electronic device of claim 1, wherein the first data debugger management mode is operative to store the debug information in the memory prior to the debug logic being depowered during the low power consumption mode; and
wherein the second data debugger management mode is operative to restore the debug information in the memory back to the debug logic after the debug logic is powered again during the normal power consumption mode.

15. The electronic device of claim 1, wherein the power management unit is operative to generate a control signal operative to control a debug I/O controller interface to a debug host.

16. The electronic device of claim 1, further comprising:
a status signal generator operative to provide a status of the interface circuit to the power management unit.

17. The electronic device of claim 1, wherein the power management unit is operative to:
subsequent to the interface circuit completing execution of the first debugger data management mode, discontinue providing power to the embedded controller.

18. The electronic device of claim 17, wherein the power management unit is operative to:
prior to the interface circuit executing the second debugger data management mode, resume providing power to the embedded controller.

19. The electronic device of claim 1, wherein the debug information captures hardware debugging functions associated with operation of a switching power supply to which the debug information pertains.

20. The electronic device of claim 1, wherein the embedded controller is coupled to a power switching converter monitored by the debug logic.

21. A method comprising:
during a switchover of an electronic device including an embedded controller from a normal power consumption mode to a low power consumption mode:
  i) retrieving, via an interface circuit, debug information from debug logic of the embedded controller; and
  ii) transmitting the retrieved debug information to a memory; and
during a switchover of the electronic device from the low power consumption mode to the normal power consumption mode:
  i) receiving, via the interface circuit, the debug information from the memory; and
  ii) storing the debug information received from the memory in the debug logic.

22. The method of claim 21 further comprising:
signaling the low power consumption mode of the electronic device to an external host computer coupled to the electronic device via at least one external contact of the electronic device.

23. The method of claim 21,
wherein the interface circuit and the memory each include at least one shift register.

24. The method of claim 21,
wherein retrieving the debug information from the debug logic of the embedded controller comprises loading a binary digital data word from the debug logic into a shift register of the interface circuit; and
wherein transmitting the retrieved debug information to the memory comprises shifting the binary digital data word of the shift register of the interface circuit bit-wise over a first serial data link into a shift register of the memory.

25. The method of claim 24,
wherein receiving the debug information from the memory comprises shifting debug data from the shift register of the memory bit-wise into the shift register of the interface circuit via a second serial data link; and
wherein storing the debug information received from the memory in the debug logic comprises writing the debug data in the shift register of the interface circuit to the debug logic.

26. The method of claim 21,
wherein the electronic device includes multiple supply domains, each of the multiple supply domains having a respective voltage supply for supplying circuitry residing within the respective supply domain;
wherein the memory resides in a first supply domain and the embedded controller resides in a second supply domain of the multiple supply domains; and
wherein the method further comprises, during switchover into the low power consumption mode, deactivating a respective voltage supply of the second supply domain, while a respective voltage supply of the first supply domain remains active.

27. The method of claim 26,
wherein the method further comprises:
when switching over from the normal power consumption mode to the low power consumption mode, reactivating the respective voltage supply of the second supply domain.

28. A switched mode power supply comprising:
a switching converter; and
an integrated control circuit coupled to the switching converter, the switching converter operative to control switching operation of the switching converter;
wherein the integrated control circuit includes an embedded controller with a debug logic, an interface circuit coupled to the debug logic, and a memory coupled to the interface circuit;
wherein the interface circuit is operative to read debug information stored in the debug logic and transmit the read debug information to the memory during a first condition of switching over an electronic device from a normal power consumption mode to a low power consumption mode; and
wherein the interface circuit is further operative to receive debug information stored in the memory and write the received debug information into the debug logic in response to a second condition of switching from the low power consumption mode back to the normal power consumption mode.

* * * * *

UNITED STATES PATENT AND TRADEMARK OFFICE
CERTIFICATE OF CORRECTION

PATENT NO. : 10,942,838 B2
APPLICATION NO. : 16/242919
DATED : March 9, 2021
INVENTOR(S) : Matthias Schneider, Arndt Pauschardt and Yuanfen Zheng Page 1 of 1

It is certified that error appears in the above-identified patent and that said Letters Patent is hereby corrected as shown below:

In the Claims

Column 9, Line 23, delete "read-"

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*